United States Patent
Loebner

[11] Patent Number: 5,525,060
[45] Date of Patent: Jun. 11, 1996

[54] MULTIPLE LANGUAGE LEARNING AID

[76] Inventor: Hugh G. Loebner, 220 W. 98th St. #2B, New York, N.Y. 10025

[21] Appl. No.: 506,961

[22] Filed: Jul. 28, 1995

[51] Int. Cl.6 ............................................. G09B 19/68
[52] U.S. Cl. ............................................. 434/171; 434/157
[58] Field of Search ............................ 434/156, 157, 434/159, 160, 171, 172

[56] References Cited

U.S. PATENT DOCUMENTS

| | | | |
|---|---|---|---|
| 3,333,351 | 8/1967 | Williams | 434/171 |
| 3,728,800 | 4/1973 | Magram | 434/171 |
| 3,858,333 | 1/1975 | Kupp | 434/156 |
| 3,950,863 | 4/1976 | Pallishusky | 434/160 |
| 4,666,163 | 5/1987 | Hirschfeld | 434/171 |
| 4,891,011 | 1/1990 | Cook | 434/157 |
| 5,180,307 | 1/1993 | Hiramhtsu | 434/157 |
| 5,257,938 | 11/1993 | Tien | 434/157 |

FOREIGN PATENT DOCUMENTS 2628842  12/1977  Germany ...................... 434/157

*Primary Examiner*—Paul J. Hirsch

[57] ABSTRACT

A multiple card flash card is disclosed that assists memorization in four domains. The disclosure discusses the application to English, and Chinese, with particular reference to pinyin, orthodox characters and simplified characters.

1 Claim, 3 Drawing Sheets

MULTIPLE LANGUAGE LEARNING AID

BACKGROUND AND SUMMARY OF THE INVENTION

In learning a new language, one task that a student must master is to pair new vocabulary words from a target language with corresponding words in his native tongue. For example, in learning Spanish, an English speaker must learn to associate the English word "water" with the Spanish word "agua."

Flash cards are a convenient and well known tool to assist the student in memorization of paired material. A flash card comprises a thin piece of cardboard of convenient dimensions which has the material to be memorized on separate sides. For use in learning a new vocabulary, a flash card has on one side a word printed in one language and on the other side the same word translated into another language.

In the usual use of flash cards, the student reads one side of the flash card and then tests himself by thinking of the translation. For example, returning to the hypothetical English speaking student learning Spanish, the student would read the word "water" on one side of the card and mentally test himself by seeing if he remembers the target word "agua." The direction of testing can go both ways, of course. A conscientious student will practice translating from Spanish to English and vice versa. Flash cards frequently have additional information on them. For example, cards with verbs on them frequently have the conjugations of that verb.

The student learning the standard Chinese language, however, has a more difficult learning task. Chinese is not written with the roman alphabet. Rather, Chinese is written with characters, of which there are many thousands. These characters are not phonetic. To make matters more complicated, there are two sets of Chinese characters in common use. The orthodox character set (or "fantizi") has been in use for several thousand years. With the establishment of the People's Republic of China, the government of that nation embarked upon a program to simplify the characters. This second set of characters of simplified characters (or "jiantizi") is widely used in the People's Republic of China while the original fantizi are used in Taiwan and the rest of the world.

In order to assist students in learning and understanding the standard Chinese language, as well as to facilitate the transliteration of Chinese names and places for foreign understanding, the government of the Peoples Republic developed the "pinyin" romanization system. Each word in Chinese has a standard phonetic translation using the letters of the Roman alphabet ("a," "b," etc.). There are other systems for the romanization of the Chinese language, such as the Yale system and the Wade-Giles system. The basic operation is the same. They differ in the choice of letters to represent sounds. For example, the sound represented by an initial "x" in pinyin is represented by the pair of initial letters "hs" in the Wade system.

An English speaking student wishing to learn to speak and read Chinese must therefore learn the pronunciation of the translated word (by pairing the English with the pinyin) as well as learn to pair the English with the orthodox and simplified character, as well as learn to pair these characters with each other, and to pair each with the pinyin pronunciation. There are thus four classes of information to be associated (1) English word, (2) pinyin/phonetic representation, (3) simplified character, and (4) orthodox character.

For this reason, it has been impossible to use regular flash cards to study Chinese conveniently. Flash cards are available, but they have not heretofore permitted the student to test himself in all the necessary tasks. If the card has English on one side and pinyin, simplified and complex characters all on the other (which is common), it does not permit practice in the association of the pronunciation with characters (since both pinyin and characters are on the same side). If one wishes to practice associating the simplified form with the complex this also can not be accomplished because both forms are on the same side.

One solution, a very unsatisfactory one, is to have six sets of flash cards for the six possible pairs to be learned: (English-pinyin), (English-simple character), (English-complex character), (pinyin-simple character), (pinyin-complex character) and (simple character-complex character). This is unsatisfactory for two reasons. The first, of course, is because it requires six sets of cards. The second reason that it is unsatisfactory is because it prevents the rapid association of related information. For example, if the student were to use an (English-complex character) flash card and wanted to refresh his memory on the pronunciation of the word he would have to look it up in a dictionary or search for the related English-pinyin flash card.

In order to overcome these difficulties, I have invented a new and useful "multi-card" to assist in the learning of Chinese. The design of the multi-card is such that it permits four different classes of information to be associated in a single multi-card. As a consequence, the student can learn and test himself on the associations between an English word, the pinyin pronunciation, the orthodox character and the simplified character. Although I invented the multi-card to assist in learning of Chinese, my invention can be used to associate any four domains of interest. For example, it could be used as a tool to help learn or review English, French, Spanish, and German languages.

Other advantages of the invention will become apparant by review of the drawings and discussion.

BRIEF DESCRIPTION OF THE DRAWINGS

FIGS. 1 shows the obverse of a first card 5. Slit 7 extends from the left edge to the center and serves to define a top portion and bottom portion of said obverse side. In FIGS. 1, 1 A represents an English word and 4 B represents the simplified character translation of the English information 1 B. 1 B is depicted in FIG. 3 which is the obverse of a second card, 6.

FIG. 2 shows the reverse of said first card 5. The reverse orientation of this card is established by flipping the card top over bottom, keeping slit 7 on the left edge. In FIG. 2, surface 3 A contains the orthodox character translation of the English word found on surface 1 A. Surface 2 B, the bottom half of the reverse side of card 5 contains the pinyin translation of the English phrases contained on surface 1 B on the bottom half of obverse side of the second card, shown in FIG. 3.

FIG. 3 shows the obverse side of the second card 6. Slit 7 is on the right side of card 6. Surface 2 A contains the pinyin translation for the corresponding the English word found on surface 1 A that is on the top half of the obverse side of the first card, as shown in FIG. 1. Surface 1 B, on the bottom half of second card 6, contains English material or phrases associated with the main word found on surface 1 A.

FIG. 4 shows the reverse side of the second card 6. The orientation of the reverse side of the card is established by flipping the card top over bottom. The top half 4 A contains the simplified character translation of the English found on 1 A. The bottom half of the reverse side of card two, 3 B, contain the orthodox character translation of the English phrases on the bottom half of the obverse side of the card (surface 1 B).

FIG. 5 shows the two cards joined via slits 7. First card, 5, is joined with second card 6, as shown, so that the top of the obverse of card 5 and the bottom of the obverse second card 6 both face forward. This provides on the top a view of the English word 1 A, and on the bottom a view of the English phrases 1 B.

FIG. 5, FIG. 6, FIG. 7, and FIG. 8 show in sequence how card 5 may be flipped around the axis formed by the joining of slits 7, bringing into view the top of the obverse side of second card 6 and the bottom of the reverse side of the first card 5. These two sides show the pinyin translations of English word and phrases. Three such flips will bring present, in sequence, the pinyin, orthodox, and simplified translations. A fourth rotation will return the original English to the front.

DESCRIPTION OF THE PREFERRED EMBODIMENT

The multi-card consists of two cards of equal dimensions each made of thin cardboard or plastic. The exact dimensions of the cards are not critical, but are determined by convenience and the amount of material to be recorded on the card. I have found that cards equal in dimension and thickness to ordinary business cards are very suitable. These cards are usually 2" by 3.5" by approximately 0.01".

Figure 1:
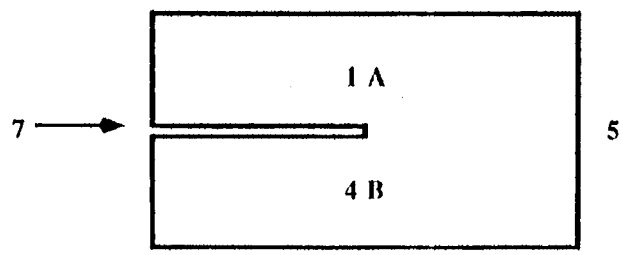
In FIG. 1 through FIG. 8, the numbers 1 through 4 indicate the domain of the subject matter on the surfaces. 1 represents English, 2 represents pinyin, 3 represents orthodox characters, and 4 represents simplified characters. Furthermore, the four classes of information are further subdivided into two components, A and B. For example 1 A represents one component of English information and 1 B represents an associated component. 1 A, in this disclosure, represents the English-word "nation," while 1 B represents two phrases associated with that word: "America," and "China."
Figure 2:
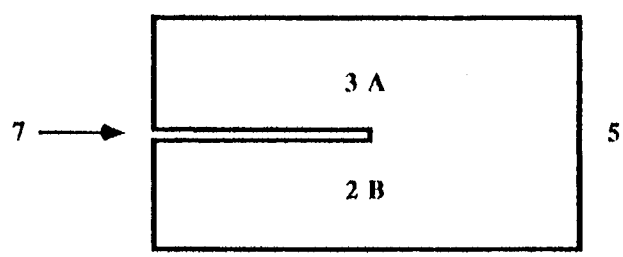
Figure 3:
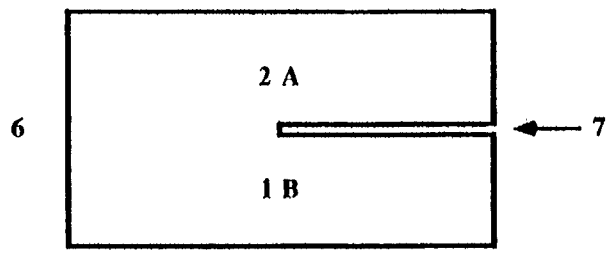
Figure 4:
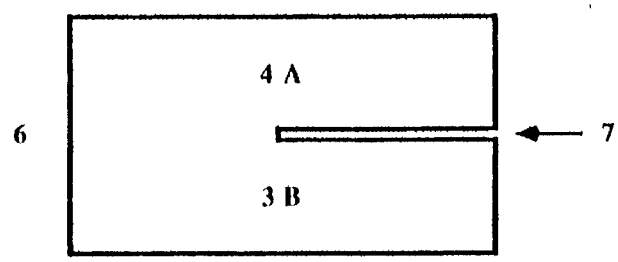
Figure 5:
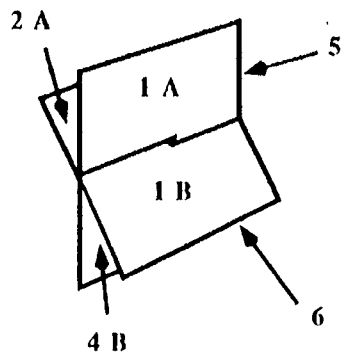
Figure 6:
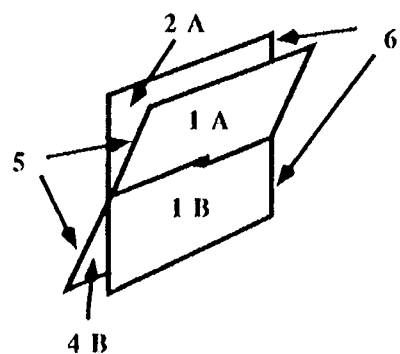
Figure 7:
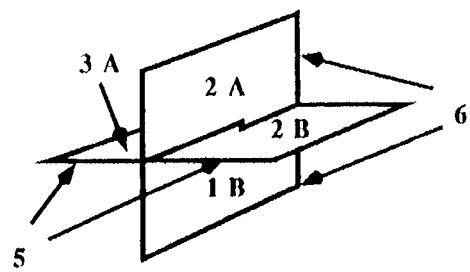
Figure 8:
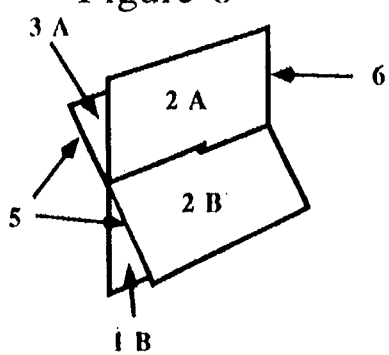
Figure 9:
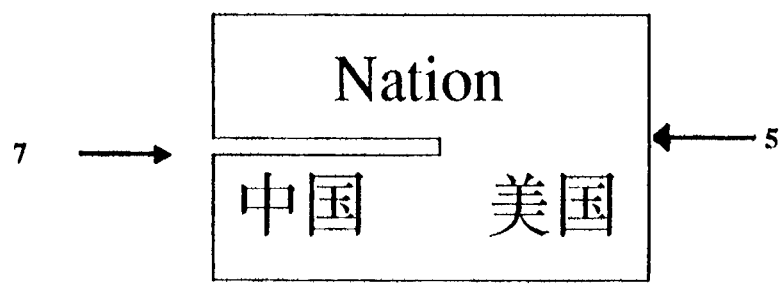
FIGS. 9, 10, 11, and 12 show a particular example of a multi-card. This example uses the English words "Country," the associated phrases "America," and "China" with pinyin, orthodox character, and simplified charters translations.
Figure 10:
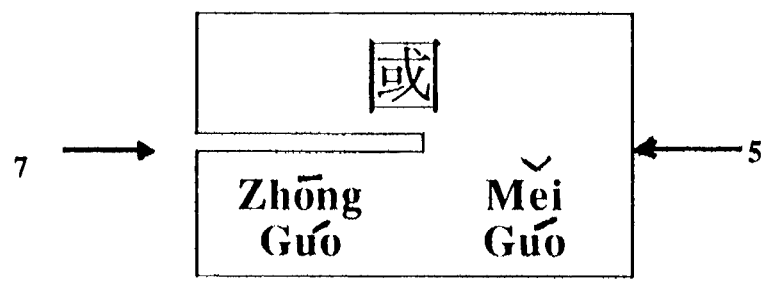
Figure 11:
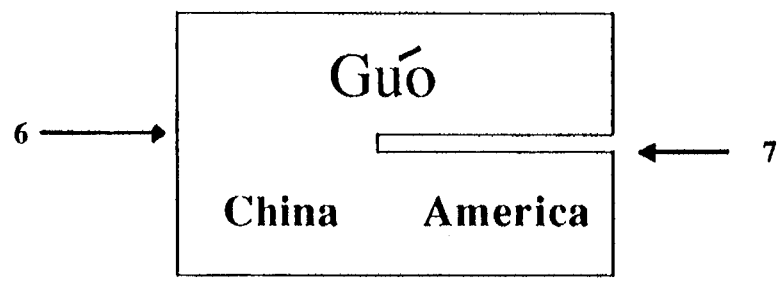
Figure 12:
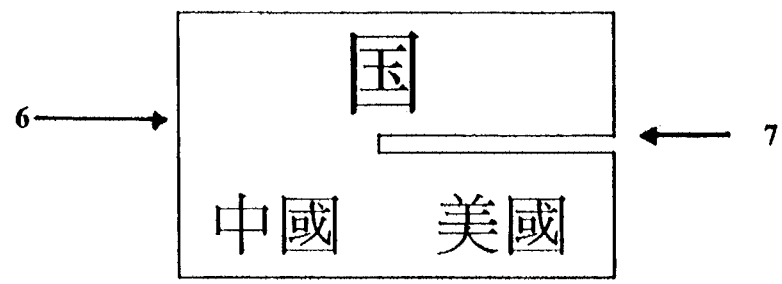

Each card has a longitudinal horizontal slit 7 with a width substantially equal to the thickness of the card and extending from one edge of each card to the center of the card. The slits extend from opposite edges of the two cards. These slits allow the two cards to be joined or interlocked as shown in FIG. 5 through FIG. 8. The cards are able to flip in the manner shown in these figures. At first, there may be a little difficulty flipping the cards, since there are several additional degrees of freedom possible. With a little practice flipping the cards becomes easy and natural. If there is any difficulty, however, one or more strips of cellophane tape can be affixed along the joint to act as hinges and eliminate all undesired degrees of freedom. In addition a groove can be embossed in each card, said grooves being co-linear with the slits and serving to restrain the cards' degrees of freedom of movement when the cards are interlocked.

It will be obvious to workers skilled in the arts that although I have chosen English, pinyin, orthodox and simplified characters in this disclosure, the multi-card will work in a similar manner for four other domains to be learned. Furthermore, because the material is presented in order according to the order of flipping, the multi-card can also be used as a convenient method of recording a process involving a number of steps.

I claim:

1. A language learning aid comprising;
   (a) a first card having an obverse side and a reverse side,
   (b) said first card having a horizontal slit running from one edge of said first card to the center of said first card;
   (c) said slit defining top portions and bottom portions of said obverse and reverse sides,
   (d) the orientation of said top and bottom portion of said reverse side being determined by flipping said first card top over bottom;
   (e) said top portion of said obverse side having a first portion of information in a defined first domain printed thereon and said bottom portion of said obverse side having a second portion of a defined fourth domain printed thereon;
   (f) said top portion of said reverse side having a first portion of a defined third domain printed thereon and said bottom portion having a second portion of a defined second domain printed thereon and;
   (g) a second card having an obverse side and a reverse side,
   (h) said second card having a horizontal slit running from one edge of said second card to the center of said second card, said edge being opposite to said edge of said first card;
   (i) said slit defining top portions and bottom portions of said obverse and reverse sides of said second card,
   (j) the orientation of said top and bottom portion of said reverse side of said second card being determined by flipping said second card top over bottom;
   (k) said top portion of said obverse side of said second card having a first portion of information in the defined said second domain printed thereon and said bottom portion of said obverse side of said second card having a second portion of said defined first domain printed thereon;
   (l) said top portion of said reverse side of said second card having a first portion of said defined fourth domain printed thereon and said bottom portion having a second portion of said defined third domain printed thereon.

* * * * *